United States Patent Office 3,272,072
Patented Sept. 13, 1966

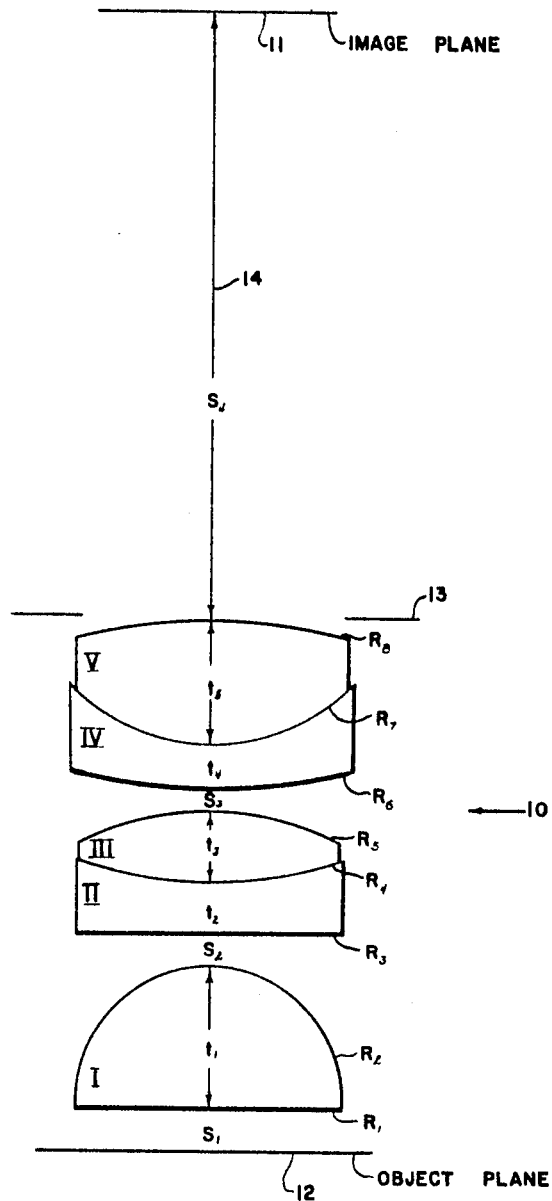

3,272,072
THREE MEMBER MICROSCOPE OBJECTIVE
George F. Ziegler, Gates, N.Y., assignor to Bausch & Lomb Incorporated, Rochester, N.Y., a corporation of New York
Filed June 17, 1963, Ser. No. 288,366
2 Claims. (Cl. 88—57)

The present invention relates to a microscope objective and more particularly relates to improvements in objectives of medium or moderate magnification.

An object of this invention is to provide an achromatic 30× microscope objective of numerical aperture 0.65 for use in a microscope in which the overall distance from the specimen plane to the eyepiece focal plane is 236.7 mm., said objective being characterized by having a long working distance.

It is an object of this invention to provide a medium power objective for microscopes and the like which is simple in form; which may be manufactured at low cost; which is parfocal with other objectives of different powers; and which is corrected for spherical aberration, coma, astigmatism, longitudinal and lateral chromatic aberrations.

Further objects and advantages will be apparent in the details of construction of the lens parts by reference to the specification herebelow taken together with the drawing wherein the single figure represents an optical diagram of a preferred form of the present invention.

In the drawing, an objective of medium power as for instance 30× magnification is generally shown by the numeral 10. An image 11, which is well corrected for spherical and chromatic aberrations, coma, astigmatism, and curvature of field, is formed of an object surface 12 by the objective 10.

Said objective 10 is composed of a front singlet lens member of plano convex form, a second lens member which is plano convex and compound in form, and a third lens member which is most rearwardly located and is compound and double convex in form. All of said lens members are spaced from each other and are mutually optically aligned along an axis 14. The front singlet lens member is designated I. The second lens member is composed of a plano-concave front lens element II and a contacting rear double convex lens element III, while the third lens member is composed of a front convex-concavo lens element IV which lies in contact with a rear double convex lens element V.

The constructional and optical data related to the objective 10 are given in the succeeding paragraphs. Accordingly, the first, second and third lens members have focal length values respectively which are, (1) $1.186F$ to $1.310F$
(2) $2.64F$ to $2.92F$
(3) $5.26F$ to $5.82F$ wherein F designates the equivalent focal length of the objective 10. Furthermore, the values for the focal lengths $F_I$ to $F_V$ of said lens elements I to V are given in the table of mathematical expressions herebelow wherein the minus (−) sign signifies negative focal length.

$$1.186F < F_I < 1.310F$$
$$3.210F < -F_{II} < 3.550F$$
$$1.550F < F_{III} < 1.710F$$
$$2.065F < -F_{IV} < 2.281F$$
$$1.522F < F_V < 1.682F$$

Additionally, the values for axial thicknesses $t_1$ to $t_5$ of the successive lens elements I to V, and the successive airspaces $S_1$ to $S_4$ between the object surface 12 and image 11 are given in the table of mathematical statements herebelow, $$.720F < t_1 < .794F$$
$$.238F < t_2 < .262F$$
$$.357F < t_3 < .393F$$
$$.238F < t_4 < .262F$$
$$.617F < t_5 < .671F$$
$$.159F < S_1 = S_2 < .175F$$
$$.0904F < S_3 < .1000F$$
$$28.65F < S_4 < 31.65F$$

and the absolute values for the refractive index $n_D$ and the Abbe number $\nu$ for the glass in the successive lens elements being given in the table of mathematical expressions herebelow, $$1.570 < n_D(I) < 1.576$$
$$1.614 < n_D(II) < 1.620$$
$$1.570 < n_D(III) < 1.576$$
$$1.717 < n_D(IV) < 1.723$$
$$1.508 < n_D(V) < 1.514$$
$$54.0 < \nu(I) < 60.0$$
$$33.0 < \nu(II) < 40.0$$
$$54.0 < \nu(III) < 60.0$$
$$26.0 < \nu(IV) < 33.0$$
$$60.0 < \nu(V) < 66.0$$

The corresponding values for the radii $R_1$ to $R_8$ of the successive lens surfaces numbering from the front of the objective, are given in the table of mathematical expressions herebelow wherein the use of the minus (−) sign therewith denotes that the centers of curvature of those lens surfaces lies on the entrant side of the vertices of such surfaces, $$R_1 > \pm 10.0F$$
$$.681F < -R_2 < .751F$$
$$R_3 > \pm 10.0F$$
$$1.981F < R_4 < 2.189F$$
$$1.501F < -R_5 < 1.659F$$
$$3.368F < R_6 < 3.722F$$
$$1.000F < R_7 < 1.104F$$
$$2.75F < -R_8 < 3.05F$$

More specifically the values of the above mentioned constructional parameters are given in the table of statements herebelow for a successful form of the present invention, the designations having the same meaning as given heretofore.

| | |
|---|---|
| $R_1$=Plano | $t_1$=.757F |
| $-R_2$=.716F | $t_2$=.250F |
| $R_3$=Plano | $t_3$=.375F |
| $R_4$=2.485F | $t_4$=.250F |
| $-R_5$=1.580F | $t_5$=.639F |
| $R_6$=3.545F | $S_1$=$S_2$=.167F |
| $R_7$=1.052F | $S_3$=.0952F |
| $-R_8$=2.900F | $S_4$=30.15F |
| $n_D(I)$=1.573 | $\nu(I)$=57.4 |
| $n_D(II)$=1.617 | $\nu(II)$=36.6 |
| $n_D(III)$=1.573 absolute | $\nu(III)$=57.4 absolute |
| $n_D(IV)$=1.720 values | $\nu(IV)$=29.3 values |
| $n_D(V)$=1.511 | $\nu(V)$=63.5 |

The corresponding specific values of focal lengths of the aforementioned lens members are given substantially as follows:

Lens member I _____ 1.248F
Lens member (II, III) _____ 2.780F
Lens member (IV, V) _____ 5.540F and the corresponding values of focal lengths for said lens elements are given substantially herebelow.

Lens element II _____ −3.380F
Lens element III _____ 1.630F
Lens element IV _____ −2.173F
Lens element V _____ 1.602F One numerical example of an objective 10 having constructional data which fulfills the objects of the present invention is given in the chart herebelow wherein the designations for the various data have the same meaning as explained in connection with the foregoing tables of values.

[E.F.L.=7.2 mm.  Magnification=30X  N.A.=0.65]

| Lens Element | Radii | Thicknesses | Spaces | $n_D$ | $\nu$ |
|---|---|---|---|---|---|
| I | $R_1$=Plano | $t_1$=5.45 | $S_1$=1.203 | 1.573 | 57.4 |
|  | $-R_2$=5.1523 |  |  |  |  |
| II | $R_3$=Plano | $t_2$=1.8 | $S_2$=1.2 | 1.617 | 36.6 |
|  | $R_4$=14.997 | $t_3$=2.7 | $S_3$=.686 | 1.573 | 57.4 |
| III | $-R_5$=11.376 |  |  |  |  |
| IV | $R_6$=25.586 | $t_4$=1.8 | $S_4$=217.08 | 1.720 | 29.3 |
|  | $R_7$=7.5858 |  |  |  |  |
| V | $-R_8$=20.893 | $t_5$=4.6 |  | 1.511 | 63.5 |

Although only a single form of the present invention is shown and described in detail, other forms are possible and changes may be made in the proportions and values of the constructional data within the ranges of values stated therein without departing from the spirit of the invention as defined in the claims here appended.

I claim:
1. An achromatic objective for a microscope and the like having a magnification of substantially 30X and a minimum aperture of substantially 0.65, said objective forming an image of an object surface, the image being well corrected for spherical and chromatic aberrations, coma, and astigmatism, said objective furthermore forming an exit pupil substantially in the plane of the vertex of the rearmost lens surface of said objective, said objective being composed of
a front singlet lens member, and
a second and a third lens member which are compound,
said members all being optically aligned with and spaced from each other,
said front lens member being nominally a plano-convex form designated I,
said second lens member being composed of a front plano-concave lens element II and a double convex lens element III, and
said third lens member being formed of a front negative meniscus lens element IV which lies in contact with a rear double convex lens element V,
the values of the radii $R_1$ to $R_8$ of the successive lens surfaces, the values of the axial thicknesses $t_1$ to $t_5$ of the successive lens elements I to V, the values for the airspaces $S_1$ to $S_4$ between said object surface and said image being given in the table of mathematical statements herebelow wherein the minus (—) signs used with the R values applies to those lens surfaces whose centers of curvature lie on the entrant side of the vertex of said surfaces, and F denotes the equivalent focal length of said objective,

$R_1$=Plano
$-R_2$=.716F
$R_3$= Plano
$R_4$=2.085F
$-R_5$=1.580F
$R_6$=3.545F
$R_7$=1.052F
$-R_8$=2.900F
$t_1$=.757F $t_2$=.250F
$t_3$=.375F
$t_4$=.250F
$t_5$=.639F
$S_1$=.167F
$S_2$=.167F
$S_3$=.0952F
$S_4$=30.15F the absolute values for the refractive index $n_D$ and Abbe number $\nu$ for the successive lens elements I to V being given in the table of mathematical statements herebelow, $n_D$(I)=1.573  $\nu$(I)=57.4
$n_D$(II)=1.617  $\nu$(II)=36.6
$n_D$(III)=1.573  $\nu$(III)=57.4
$n_D$(IV)=1.720  $\nu$(IV)=29.3
$n_D$(V)=1.511  $\nu$(V)=63.5

2. An achromatic objective for a microscope and the like having a magnification of substantially 30X and a minimum aperture of substantially 0.65, said objective forming an image of an object surface, the image being well corrected for spherical and chromatic aberrations, coma, and astigmatism, said objective furthermore forming an exit pupil substantially in the plane of the vertex of the rearmost lens surface of said objective, said objective being composed of
a front singlet lens member, and
a second and a third lens member which are compound,
said members all being optically aligned with and spaced from each other,
said front lens member being nominally a plano-convex form designated I,
said second lens member being composed of a front plano-concave lens element II and a double convex lens element III, and
said third lens member being formed of a front negative meniscus lens element IV which lies in contact with a rear double convex lens element V,
the numerical values of the constructional data related to one form of said objective being given in the chart herebelow wherein $R_1$ to $R_8$ designate the radii of the successive lens surfaces, the minus (—) sign used therewith applying to those lens surfaces which have their centers of curvature located on the entrant side of the vertex of said surfaces, $t_1$ to $t_5$ designate axial thicknesses of the successive elements I to V, $S_1$ to $S_4$ designate the successive airspaces between the object surface and said image, $n_D$ and $\nu$ denoting respectively the refractive index and Abbe number of said lens elements,

[E.F.L.=7.2 mm.  Magnification=30X  N.A.=0.65]

| Lens Element | Radii | Thicknesses | Spaces | $n_D$ | $\nu$ |
|---|---|---|---|---|---|
| I | $R_1$=Plano | $t_1$=5.45 | $S_1$=1.203 | 1.573 | 57.4 |
|  | $-R_2$=5.1523 |  |  |  |  |
| II | $R_3$=Plano | $t_2$=1.8 | $S_2$=1.2 | 1.617 | 36.6 |
|  | $R_4$=14.997 | $t_3$=2.7 | $S_3$=.686 | 1.573 | 57.4 |
| III | $-R_5$=11.376 |  |  |  |  |
| IV | $R_6$=25.586 | $t_4$=1.8 | $S_4$=217.08 | 1.720 | 29.3 |
|  | $R_7$=7.5858 |  |  |  |  |
| V | $-R_8$=20.893 | $t_5$=4.6 |  | 1.511 | 63.5 |

All scalar values given in millimeters.

References Cited by the Examiner

UNITED STATES PATENTS 2,781,694  2/1957  Takahashi _____ 88—57

JEWELL H. PEDERSEN, *Primary Examiner.*

JOHN K. CORBIN, *Examiner.*

UNITED STATES PATENT OFFICE
CERTIFICATE OF CORRECTION

Patent No. 3,272,072                              September 13, 1966

George F. Ziegler

It is hereby certified that error appears in the above numbered patent requiring correction and that the said Letters Patent should read as corrected below.

Column 2, line 50, for "$R_4=2.485F$" read -- $R_4=2.085F$ --; line 56, for "$\nu(III)=36.6$" read -- $\nu(II)=36.6$ --.

Signed and sealed this 26th day of September 1967.

(SEAL)
Attest:

ERNEST W. SWIDER                              EDWARD J. BRENNER
Attesting Officer                                    Commissioner of Patents